Figure 1:
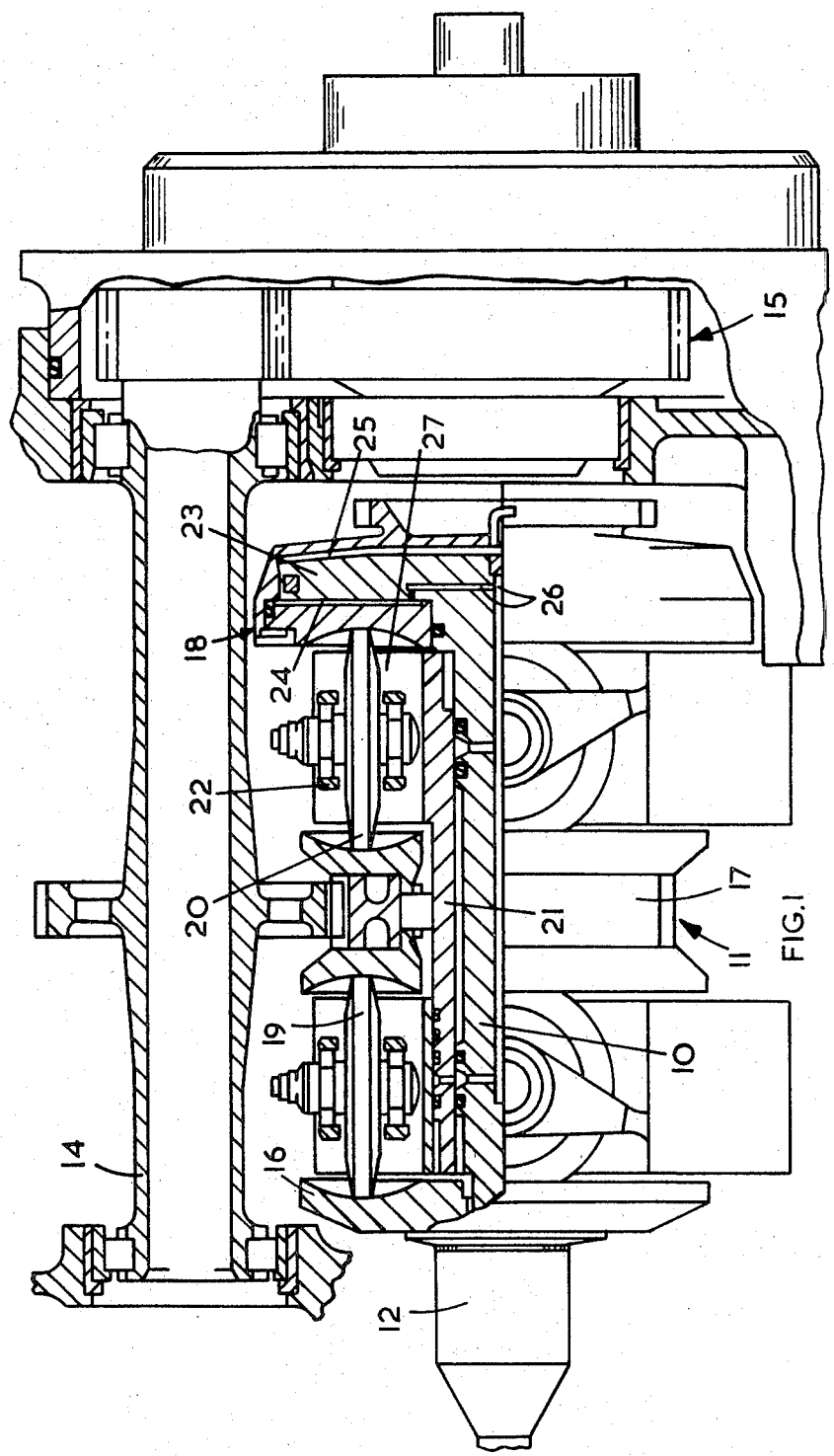

United States Patent [19]
Gomersal et al.

[11] 3,865,125
[45] Feb. 11, 1975

[54] GOVERNOR

[75] Inventors: Keith Gomersal; Brian Padgett, both of Yorkshire, England

[73] Assignee: Rotax Limited, Birmingham, England

[22] Filed: Apr. 4, 1974

[21] Appl. No.: 457,976

Related U.S. Application Data

[63] Continuation of Ser. No. 275,882, July 27, 1972, abandoned.

[30] Foreign Application Priority Data

July 27, 1971 Great Britain .................... 35324/71

[52] U.S. Cl. ...................... 137/51, 137/53, 137/468
[51] Int. Cl. .......................................... G05d 13/30
[58] Field of Search ............ 73/537; 137/51, 53, 58, 137/85

[56] References Cited
UNITED STATES PATENTS

| | | | |
|---|---|---|---|
| 2,252,838 | 8/1941 | Drake et al. ...................... | 73/537 X |
| 2,691,382 | 10/1954 | Frick ...................................... | 137/53 |
| 2,915,076 | 12/1959 | Teumer .................................. | 137/51 |
| 2,923,307 | 2/1960 | Grogan ............................... | 137/85 X |
| 2,944,559 | 7/1960 | Rumsey ................................ | 137/85 |
| 2,976,946 | 3/1961 | Denman et al. ................... | 137/58 X |

Primary Examiner—Robert G. Nilson
Attorney, Agent, or Firm—Holman & Stern

[57] ABSTRACT

A governor comprises a plurality of weights which, in use, and when they are rotated bodily about the governor axis pivot under the influence of centrifugal force to effect movement of a piston valve against the action of resilient means. Such movement of the piston valve is arranged to control the flow of hydraulic fluid which is to be controlled by the governor. An hydraulic fluid outlet of the governor is connected to one end of a cylinder of a piston and cylinder assembly, the piston of the piston and cylinder assembly being arranged to act on one end of the resilient means whereby axial movement of the piston will result in a variation in the datum position of the one end of the resilient means, the other end of the resilient means acting on the piston valve. The arrangement is such that an increase or decrease in the fluid pressure at the outlet and caused by movement of the piston valve will effect movement of the piston and thus a variation in the datum position of the one end of the resilient means such that, at least during steady state conditions of the piston valve, the resilient means will be compressed or expanded as the case may be to the same or substantially the same extent.

1 Claim, 2 Drawing Figures

GOVERNOR

This is a continuation, of application Ser. No. 275,882, filed July 27, 1972, now abandoned.

This invention relates to a governor which is used in an hydraulic control of a variable-ratio frictional drive gear of the kind comprising two axially spaced torus discs between which there is a set of circumferentially spaced drive rollers in frictional rolling contact with toroidal surfaces on the discs, each roller being rotatably mounted in a tangentially controlled roller carriage having end portions lying on a roller tilt axis at right angles to the axis of rotation of the roller, the end portions of each roller carriage being slidably and rotatably supported by the arms of a spider member whereby the roller carriages can be moved tangentially by means of hydraulic fluid in order to control indirectly the ratio angle of the roller, said hydraulic fluid being controlled by a control system incorporating the governor.

It is an object of the present invention to provide such a governor in an improved form.

In accordance with the present invention there is provided a governor comprising a plurality of weights which, in use and when they are rotated bodily about the governor axis, pivot under the influence of centrifugal force to effect movement of a piston valve, against the action of resilient means, such movement of said piston valve being arranged to control the flow of hydraulic fluid which is to be controlled by said governor, wherein an hydraulic fluid outlet of the governor is connected to one end of a cylinder of a piston and cylinder assembly, the piston of said piston and cylinder assembly being arranged to act on one end of said resilient means whereby axial movement of said piston will result in a variation in the datum position of said one end of the resilient means, the other end of said resilient means acting on said piston valve, the arrangement being such that, in use, an increase or decrease in the fluid pressure at said outlet and caused by movement of said piston valve will effect movement of said piston and thus a variation in the datum position of said one end of the resilient means such that, at least during steady state conditions of said piston valve, said resilient means will be compressed or expanded as the case may be to the same or substantially the same extent.

Preferably, said piston is arranged to act on said resilient means by means of a pivotable lever and, conveniently, said resilient means is in the form of a coiled spring.

Desirably an accumulator is connected between said governor outlet and said one end of said cylinder to thus ensure that a delay occurs between movement of said piston valve and movement of said piston.

Figure 2:
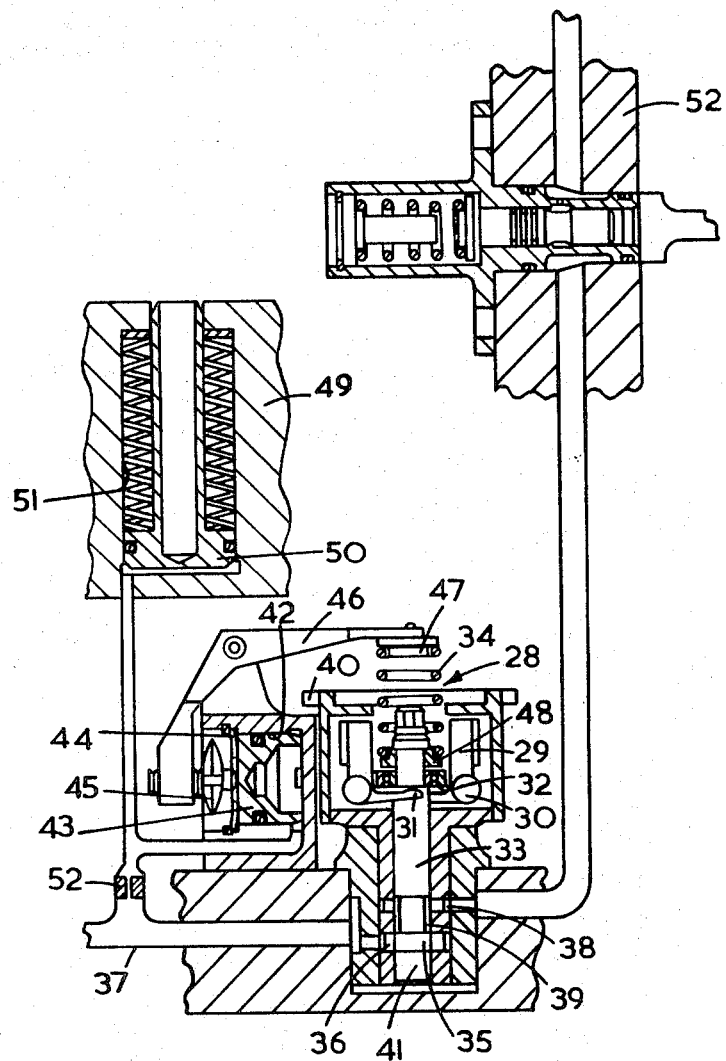

The invention will now be more particularly described with reference to the accompanying drawings:

FIG. 1 is a sectional view of a variable ratio frictional drive gear in conjunction with which one embodiment of a governor according to the present invention is intended to be used, and FIG. 2 is a sectional view of one embodiment of a governor according to the present invention.

Referring now more particularly to FIG. 1 of the drawings, there is shown therein a variable ratio frictional drive gear 11 having an output shaft 10 which drives a load shaft 12. The input of the gear 11 is transmitted to a lay shaft 14, via a gear train which is indicated by the reference numeral 15.

The gear 11 consists of three torus discs 16, 17 and 18 between which two sets of rollers 19 and 20 are in frictional rolling engagement, the central disc 17 being double-sided. This central torus disc 17 is rotationally connected to the lay shaft 14 (with freedom to move slightly axially) and is mounted on bearings within a sleeve member 21. The outer disc 16 is secured to the output shaft 10 for rotation therewith and so as to be axially fixed with respect to the shaft 10, whilst the other disc 18 is connected to the output shaft for rotational movement therewith and axial movement relative thereto. The drive ratio of the gear 11 is varied by altering the ratio angle of the rollers. As shown in FIG. 1, the rollers 19, 20 are shown at a ratio angle at which they engage the central disc 17 at an equal radius to that of the outer discs 16 and 18 respectively, thus the gear shown transmits a gear ratio at a 1:1 ratio. The rollers 19, 20 are mounted in roller carriages 22 and control of the ratio angle is achieved by bodily moving the roller carriages 22 in substantially tangential directions with respect to the gear axis and by allowing the rollers then to steer themselves towards a different ratio angle. The roller carriages are arranged so that a camber angle is furnished, that is to say an angle of inclination exists between the tilt axis of each roller carriage and a plane normal to the gear axis. This camber angle gives rise to a desirable mode of damping which can virtually eliminate any tendency for ratio angle oscillation and this facilitates the design of a highly stable gear without the need for elaborate additional damping devices for achieving the necessary damping. Furthermore, the degree of camber angle provided together with the maximum available tangential movement of each roller carriage will dictate the maximum degree of tilt (or ratio angle change) of the roller carriage.

The disc 18 is hollow and there is provided within the disc 18 a piston 23 which is secured to the output shaft 10. The piston 23 defines two axially spaced chambers 24 and 25 between opposed axial sides of the piston and the hollow disc 18. Pressurised fluid can thus be fed into the chamber 24 via passages 26 to effect axial movement of the disc 18 whilst fluid from a relatively low pressure force can be fed into the chamber 25. Thus, pressure of fluid in the chamber 25 induced by centrifugal force on rotation of the gear 11 will serve to balance or substantially balance fluid pressure in the chamber 24 similarly induced by centrifugal force.

The end portions of each roller carriage 22 are slidably and rotatably supported by the arms of a spider member 27. One end portion of each roller carriage has a piston (not shown) which is slidable in a pressure cylinder (not shown) in one of the spider arms, and the other end portion has a guide portion (not shown) slidable in a guide cylinder (not shown) in another of the spider arms. Movement of each roller carriage 22 in the aforesaid substantially tangential direction with respect to the gear axis, is effected by hydraulic fluid which is supplied to the associated pressure cylinder and which is supplied by a control circuit incorporating a governor 28 (FIG. 2).

Referring now more particularly to FIG. 2 of the drawings, the governor 28 shown therein may conveniently be driven by the load shaft 12 (shown in FIG. 1) to maintain the speed of the latter at a constant value. The governor is of a conventional form and includes a plurality of pivoted weights 29 which are pivoted on pins 30 and which are rotatable bodily about the axis of the governor so that inwardly directed finger portions 31 on the weights bear upwards on a flange 32 of a piston valve 33, against the action of a coiled compression spring 34, with a force which increases with increasing rotational speed owing to the centrifugal forces on the weights. When the speed of the rotation of the load shaft 12 is at the desired value, a land portion 35 of the piston valve will be substantially centrally disposed with respect to a port 36 which is connected to a supply pipe 37 itself connected to the aforesaid pressure cylinders. A pump (not shown) will, in use, supply hydraulic fluid to an input of the governor, that is to say a port 38 which communicates with an annular chamber 39 defined by the piston valve 33. When, in use, the load shaft is rotating at a speed below the desired value then the governor will be rotated through the intermediary of a gear wheel 40 at such a speed that the land portion 35 will be so disposed that the annular chamber 39 will communicate with the port 36 to thus permit fluid to pass through the governor to the aforesaid pressure cylinders associated with the roller carriages 22. The governor is also provided with a drain space 41 such that, in use, if the load shaft 12 attains a speed above the desired value then the land portion 35 will be moved upwardly from the position shown in FIG. 2 and hydraulic fluid within the supply pipe 37 will be allowed to fall into the drain space 41 to thus reduce the pressure of hydraulic fluid in the aforesaid pressure cylinders.

The output port 36 is also connected to one end of a cylinder 42 of a piston and cylinder assembly. That axial end of the piston (indicated at 43) of the piston and cylinder assembly remote from said one end engages a Bellville washer 44. The piston 43 acts through the intermediary of a temperature compensating device 45 on one end of a pivotal lever 46 which is pivoted about a position substantially midway between its ends. The other end of the lever 46 has connected thereto a flanged disc 47. One axial end of the spring 34 is supported by the flange of the flanged disc 47 and the other axial end of the spring 34 is supported on a flanged annular support 48 which is secured to the piston valve 33. Also connected to the output port 36 of the governor is an hydraulic accumulator 49 of the type having a spring biassed piston 50 movable in a cylinder 51.

Conveniently, the piston 43 is slidable in the cylinder 42 in a direction perpendicular to the axis of the governor and in this case, the lever 46 is arranged with its two ends extending at right angles to each other.

In use, the variable ratio frictional drive gear may be conveniently used to drive an aircraft alternator wherein the input of the gear rotates at a variable speed. Thus assuming then that the alternator is rotating at its required speed when it is subjected to an additional load, it will be understood that the speed of the alternator will reduce slightly thus reducing the speed of rotation of the governor 28. This reduction in speed of the governor 28 will effect downward movement of the piston valve 33 so that the land portion 35 will move downwardly with respect to the output port 36 to permit an increased flow of hydraulic fluid through the governor to the aforesaid pressure cylinders associated with the roller carriages. This will effect the necessary increase in speed of the alternator so that it will once again be rotating at its required speed. However, it will be noted that in order to compensate for the additional load to which the alternator is subjected the piston valve 33 of the governor 28 has to take up a new position. In such a new position the spring 34 would be in a different state of compression and to overcome this disadvantage the aforesaid piston and cylinder assembly and the pivotable lever 46 are provided. Taking by way of example the aforesaid increase in load on the alternator then the pressure of hydraulic fluid at the governor outlet port 36 will increase. This increase in fluid pressure will be transmitted to said one end of the cylinder 42 which will effect slight movement of the piston 44 and thus slight pivotal movement of the lever 46 so that said one axial end of the spring 34 will move downwardly from the position shown in FIG. 2 to take up a new datum position. This will cause the state of compression of the spring 34 to be maintained at a constant or substantially constant value during all steady state conditions of the governor. The accumulator 49 is provided to prevent any initial change in fluid pressure presented at the governor outlet being transmitted to the cylinder 42. This together with the provision of a restrictor 52 in the connection between the output port 36 and said one end of the cylinder 42 ensures that a delay occurs between movement of the piston valve 33 and movement of the piston 42 so that transient effects on the piston 42 will be removed, also so that there is a minimal adverse effect upon the stability of the governor.

If the alternator is subjected to a decrease in load then the piston valve 33, the aforesaid piston and cylinder assembly and the accumulator 49 will all act in the opposite sense to thus ensure that, at least during steady state conditions of the piston valve 33, the spring 34 will be compressed to the same or substantially the same extent.

It is to be appreciated that the spring 34 may be replaced by any other convenient resilient means. Furthermore, a pressure relief valve 52 is incorporated within the supply of the hydraulic fluid to regulate the pressure of the hydraulic fluid supplied to the governor.

We claim:

1. A governor comprising: a plurality of rotatable weights; a governor axis about which the weights are mounted for pivotal movement under the influence of centrifugal force; a piston valve connected to the weights, the piston valve being movable axially by said weights; resilient means, one end of which acts on one end of said piston valve to oppose axial movement thereof; a fluid inlet of the governor; a fluid outlet of the governor; said piston valve being interposed between said inlet and said outlet to define means for controlling fluid flow therethrough; a piston means and cylinder assembly, said cylinder having said outlet connected thereto, said piston means of said assembly being connected to act on the other end of said resilient means such that axial movement of said piston means results in a substantially uniform variation in the datum position of said one end of said resilient means; and a restrictor and a hydraulic accumulator connected in passage means between said governor outlet and said one end of said cylinder of said assembly.

* * * * *